United States Patent [19]

Pettit

[11] 4,030,322
[45] June 21, 1977

[54] LOCKING GAS CAP SYSTEM

[76] Inventor: Charles E. Pettit, 12000 Moonlight Road, Olathe, Kans. 66061

[22] Filed: Apr. 28, 1976

[21] Appl. No.: 681,168

[52] U.S. Cl. .................................. 70/159; 70/257; 220/211; 292/144

[51] Int. Cl.² .................. B65D 55/41; B60R 25/00

[58] Field of Search ............ 70/159, DIG. 30, 241, 70/255, 257; 220/210, 211, 230, 86 AT; 292/144, 201

[56] References Cited

UNITED STATES PATENTS

| 2,139,193 | 12/1938 | Lamothe et al. | 70/159 UX |
| 3,648,491 | 3/1972 | Kennard | 70/241 |
| 3,759,075 | 9/1973 | Lipschutz | 70/159 |

Primary Examiner—J. Franklin Foss
Attorney, Agent, or Firm—John A. Hamilton

[57] ABSTRACT

A locking cap for the gasoline tank of a automotive vehicle, having an electrically actuated device for unlocking the cap, the unlocking device having an operative electrical circuit including an electric switch actuated by the ignition key of the vehicle. The switch can be closed only at a position of the key corresponding to an "engine-off" condition, so that the cap cannot be unlocked with the engine running. The unlocking device includes a hammer-blow apparatus for assisting in the opening of the cap in the event it should be frozen shut.

3 Claims, 4 Drawing Figures

U.S. Patent  June 21, 1977  4,030,322
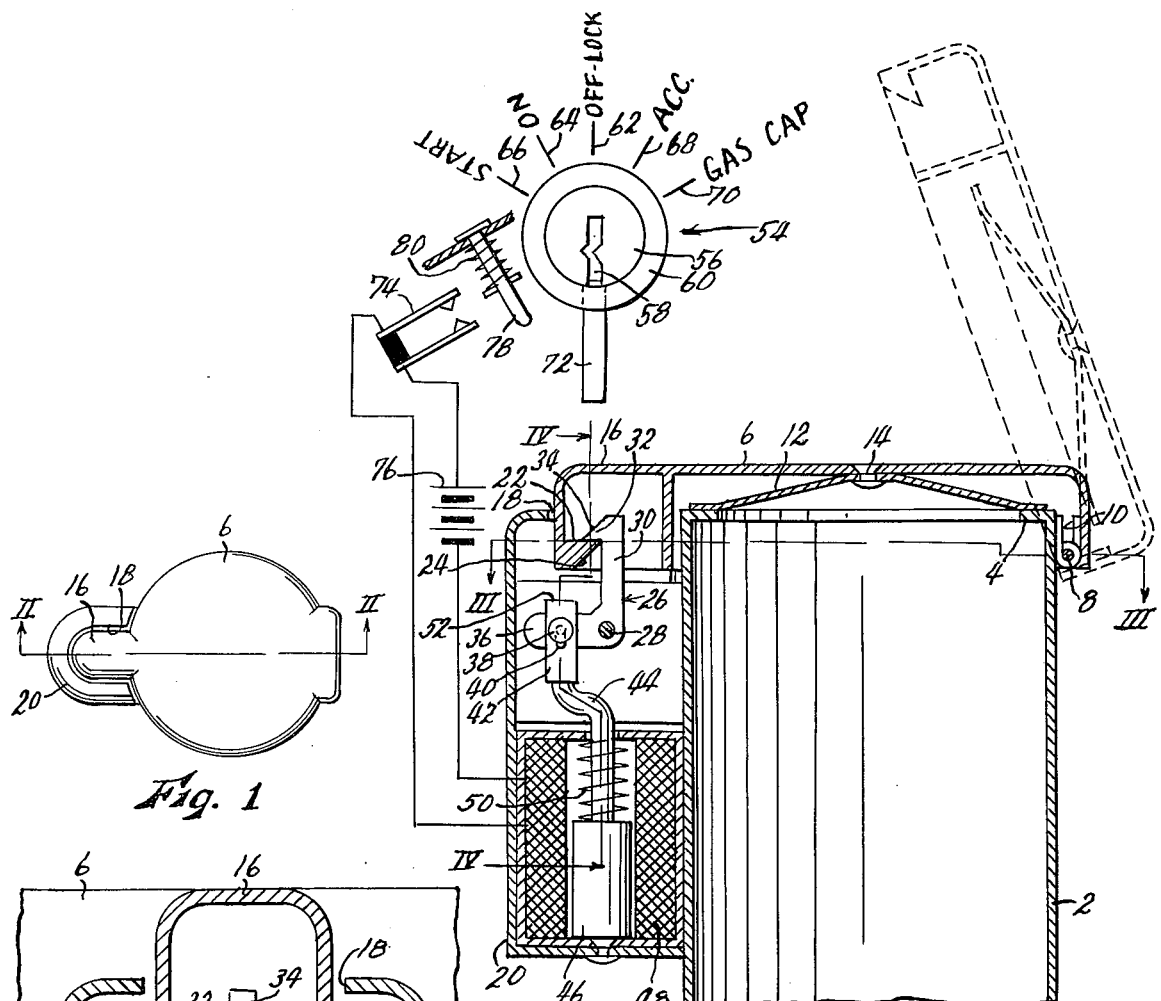

LOCKING GAS CAP SYSTEM

This invention relates to new and useful improvements in locking systems for the caps of the gasoline tanks of automotive vehicles.

Key-actuated locks for gas tank caps have been utilized, but have been subject to certain disadvantages in use, although the advantages of locking caps in discouraging the theft of gasoline from tanks are obvious. For example, the gas cap key represents an additional key the motorist must keep handy at all times, which is an annoyance. The key can easily be lost or misplaced. It must also be given to the service station attendant, who may forget to give it back to the motorist.

Accordingly, a primary object of the present invention is the provision of a gas locking system in which the cap may be unlocked by remote control from the drivers seat, with no necessity of passing a key back and forth between the driver and the attendent. This is accomplished by the use of a lock which is released by an electrical device having an operative electric circuit controlled by a switch disposed conveniently to the driver.

To provide the added security of a key lock, without at the same necessitating an extra key, the switch of the electrical circuit is controlled by the usual ignition key of the vehicle.

Another object is the provision of a gas cap locking system of the character described which automatically enforces the oftenignored safety direction at service stations that the vehicle engine should be stopped while the tank is being filled. This is accomplished by the provision that the cap unlocking device is not only energized by turning the ignition key, but also can be energized only by turning said key to a position at which the vehicle engine is actually stopped.

A still further object is the provision of a gas cap locking system of the character described in which the unlocking device is operable, when energized repeatedly, to deliver a series of hammer blows operable first to assist in disengagement of the lock, and then to assist in opening the cap itself. This provision is useful when the locking device and the cap have become iced in position by frozen moisture, as sometimes happens during winter weather.

Other objects are simplicity and economy of construction, and efficiency and dependability of operation.

With these objects in view, as well as other objects which will appear in the course of the specification, reference will be had to the accompanying drawing, wherein:

FIG. 1 is a top plan view of the gas tank cap and related elements having a locking system embodying the present invention, with the cap shown in its closed position, FIG. 2 is an enlarged, fragmentary sectional view taken on line II—II of FIG. 1, the cap being shown closed in solid lines and open in dotted lines, and including a schematic representation of the control system of the device, FIG. 3 is a sectional view taken on line III—III of FIG. 2, with parts left in elevation, and, FIG. 4 is an enlarged, fragmentary sectional view taken on line IV—IV of FIG. 2.

Like reference numerals apply to similar parts throughout the several views, and the numeral 2 applies to the tubular filling neck to an automotive vehicle gasoline tank, the outer end portion thereof being shown. At its extreme outer end, it is provided with an unturned peripheral lip 4. Said neck is provided with a cap 6 which is generally of inverted cup form, being adapted to enclose the extreme outer end portion of neck 2. Said cap is connected to the neck by means of a hinge 8. Said hinge is provided with a clock spring 10 operable to open the cap, as indicated in dotted lines in FIG. 2, whenever the cap locking means to be described is released. If the cap is of a type which must seal when closed, a conical, resiliently yieldable sealing disc 12 is affixed centrally to the inside of the cap as by rivet 14, its peripheral edge portion being pressed firmly against neck lip 4 whenever the cap is closed.

Cap 6 is provided, at the side thereof diametrically opposite from hinge 8, with a hollow, downwardly opening, radial projection 16. When the cap is closed, said projection enters into an opening 18 formed in the top of a lock housing 20 mounted externally on neck 2. Said housing may be either integral with or permanently affixed to said neck. Formed within projection 16 of the cap, integrally therewith, is an upwardly facing ledge 22. The free edge of said ledge extends toward, and is parallel to, the axis of hinge 8, while the lower surface 24 of said ledge is bevelled downwardly and away from said free edge.

Disposed within the upper portion of lock housing 20 is a right angled lock lever 26, pivoted at its angle in said housing by a pivot pin 28 which is parallel to hinge 8. Said lever includes a generally vertical leg 30 which, when cap 6 is closed, projects upwardly into cap projection 16 and is provided at its upper end with a downwardly facing tooth 32 operable to engage over ledge 22 to secure the cap closed. The upper surface 34 is bevelled parallel to bevelled surface 24 of the ledge. Said lever also includes a generally horizontal leg 36 in which is mounted a pivot pin 38 which is parallel to but spaced apart from lever pivot 28. Pivot pin 38 projects through vertically elongated slots 40 (see FIG. 4) formed in the arms of a clevis 42 embracing lever leg 36. Said clevis is affixed to the upper end of an operating rod 44, said rod extending downwardly and being affixed at its lower end to the movable armature 46 of a solenoid coil 48 mounted in the lower portion of lock housing 20. Said armature is biased downwardly by a spring 50, but is elevated against said spring whenever coil 48 is energized. Thus whenever said coil is energized, clevis 42 is elevated to pivot lever 26 in a clockwise direction, as viewed in FIG. 2, to disengage its tooth 32 from cap ledge 22, so that the cap is opened by spring 10. When the lock tooth 32 is engaged and solenoid armature 46 is fully lowered, lever pivot pin 38 is engaged in the top ends of clevis slots 40. Therefore, armature spring 50 tends to hold the lock in its engaged position. Also, the engaging surfaces of tooth 32 and ledge 22 are so inclined that no opening force applied to the cap has any tendency to pivot lever 26 to its unlocked position. As the cap is closed manually, the bevelled surfaces 34 and 24 of the tooth and ledge cooperate to cam the lever in a clockwise direction, against spring 50, to allow engagement of the lock.

When solenoid coil 48 is energized, armature 46 is raised against spring 50 until the lower ends of clevis slots 40, engage and strike pivot pin 38 to pivot lever 26. The lost motion of the armature provided by slots 40 thus permits the armature to accelerate and develop some momentum, so as to deliver a hammer blow to lever 26. This is useful when the locking lever becomes stuck or locked against motion by frozen moisture, as sometimes occurs in freezing weather, or for any other reason. Repeated intermittent energization of coil 48 will deliver any number of hammer blows required to free the lever. After the lever is freed, overtravel of the armature causes the upper end 52 of clevis 42 to strike the lower edge of cap projection 16, so that hammer blows may be utilized to free the cap itself in the event it may be frozen shut.

FIG. 2 shows a schematic diagram of the control system for solenoid coil 48. The usual ignition lock of an automative vehicle is indicated generally at 54, and includes a lock barrel 56 having a keyhole 58, and which may be turned in a casing 60 only when the proper key is inserted in said keyhole, all as well understood in the art. Turning of the key has several functions not pertinent to the present invention, usually having a first position 62 at which the entire electrical system of the vehicle is shut off, and which is the only position at which the key may be inserted and withdrawn, a second position 64 at which the ignition system of the vehicle is energized, a third position 66 at which the electric starter of the vehicle engine is energized, the key being automatically returned to position 64 by spring means after the engine is started, and a fourth position 68, disposed at the opposite side of position 62 from positions 64 and 66, at which the ignition system is de-energized, but at which various accessories, such as radio, heater, windshield wipers and the like may be operated.

In accordance with the present invention, however, switch 54 is provided with a fifth position 70. Lock barrel 56 has an arm 72 or other switch operating means, affixed thereto and operable, when the key is turned to position 70, to close a normally open electric switch 74. Switch 74 is included in a simple electric circuit in series with solenoid coil 48 and a source of electric power represented by battery 76, which may be the standard vehicle battery. Also provided is a return plunger 78, biased by a spring 80, which is positioned to allow switch 54 to rest in position 68, but which is engaged and moved against spring 80 by arm 72 to allow the switch to be moved to position 70. The switch is returned to position 68 automatically by plunger 78 whenever the ignition key is released. This prevents drain on the battery 76 by solenoid coil 48 which could occur if the ignition switch were inadvertently left in position 70.

Thus it will be apparent that a locking system for automotive vehicle gasoline tank caps having several advantages has been produced. It is remotely controlled from the drivers seat, so that the driver need never alight from the vehicle nor pass a key to and from a service station attendent. While it provides the added security of a key-lock system, it does not require the inconvenience of an additional key to be kept in the custody of the motorist, since the usual ignition key is utilized for this purpose. It requires that the vehicle engine be shut off before the gas cap can be unlocked, thus automatically enforcing observation of the often ignored safety rule that gasoline should never be introduced into the tank while the engine is running. It is operative, by repeatedly turning the ignition key to position 70, to deliver a series of hammer blows to assist in the release of the locking elements, and/or the opening of the cap itself, as may be required if either of these elements should be frozen or stuck.

While I have shown and described a specific embodiment of my invention, it will be readily apparent that many minor changes of both structure and operation could be made without departing from the spirit of the invention.

What I claim as new and desire to protect by Letters Patent is:

1. A locking system for the cap of the gasoline tank of an automative vehicle, said locking system comprising:
  a. manually operable locking means for locking said cap closed whenever said cap is manually closed, said locking means including a lock member movable between a locking position directly engaging said cap and an unlocking position out of engagement with said cap,
  b. unlocking means operable when actuated to move said lock member to said unlocking position, and
  c. operating means including a manually movable member disposed interiorly of said vehicle and operable by movement of said member to actuate said unlocking means, said unlocking means including a striker member operable to strike said lock member with a hammer blow to drive said lock member toward its unlocking position whenever said unlocking means is actuated.

2. A system as recited in claim 1 wherein said striker member has a degree of lost motion, after actuation of said unlocking means, before it strikes said lock member, whereby to deliver repetitive hammer blows to said lock member in response to repeated actuations of said unlocking means.

3. A system as recited in claim 2 wherein said striker member is operable, after moving said lock member to its unlocking position, to strike and deliver hammer blows to the cap itself, said blows being directed to open said cap.

* * * * *